United States Patent [19]

Falk et al.

[11] Patent Number: 4,611,912

[45] Date of Patent: Sep. 16, 1986

[54] METHOD AND APPARATUS FOR OPTICALLY MEASURING DISTANCE AND VELOCITY

[75] Inventors: Robert A. Falk, Louisville; Gary L. Phillis, Boulder, both of Colo.

[73] Assignee: Ball Corporation, Muncie, Ind.

[21] Appl. No.: 481,988

[22] Filed: Apr. 4, 1983

[51] Int. Cl.$^4$ ............................ G01C 3/08; G01P 3/36
[52] U.S. Cl. ........................................ 356/5; 356/28.5
[58] Field of Search ........................ 356/5, 2.8, 28.5; 372/31

[56] References Cited

U.S. PATENT DOCUMENTS

| | | | |
|---|---|---|---|
| 3,341,708 | 9/1967 | Bilderback | 372/31 X |
| 3,825,340 | 7/1974 | Debart | 356/5 |
| 3,841,755 | 10/1974 | Debart | 356/28 |
| 4,009,385 | 3/1976 | Sell | 372/31 X |
| 4,025,194 | 5/1977 | Teppo | 356/5 |
| 4,101,847 | 7/1978 | Albanese | 372/31 |
| 4,140,060 | 2/1979 | Brenner | 102/214 |
| 4,190,362 | 2/1980 | Dubrunfaut | 356/5 |

OTHER PUBLICATIONS

Hulme, Collins, Constant, Pinson; "A $CO_2$ Laser Rangefinder Using Heterodyne Detection and Chirp Pulse Compression"; *Opt. Quantum Electronics* (1981).

*Primary Examiner*—Stephen C. Buczinski
*Assistant Examiner*—Linda J. Wallace
*Attorney, Agent, or Firm*—Sheridan, Ross & McIntosh

[57] ABSTRACT

An apparatus is provided for use in optically determining distance and velocity relating to an object. The apparatus includes an optical radiation source that emits a first optical radiation signal of a modulating amplitude. The amplitude modulation of the first optical radiation signal is swept over a predetermined frequency range in a predetermined time period. Common optical components are employed to direct the first optical radiation signal towards the object, and to receive a portion of the first optical radiation signal that reflects off of the object. A portion of the first optical radiation signal is internally reflected by one of the common optical components to obtain a second optical radiation signal. An optical heterodyne detector optically mixes the received first and second optical radiation signals to produce an electrical output signal. The frequency of the electrical output signal is measured, and the frequency measurements are used to determine first and second frequency components. The first frequency component and the aforementioned predetermined frequency sweep time period are used to determine the distance of the object relative to the apparatus, and the second frequency component, which represents a Doppler shift, is employed to determine the velocity of the object.

9 Claims, 3 Drawing Figures

METHOD AND APPARATUS FOR OPTICALLY MEASURING DISTANCE AND VELOCITY

FIELD OF THE INVENTION

The present invention relates to telemetry and the use of optical radiation to measure the distance and speed of an object, and more particularly, to sweeping the frequency of amplitude modulation of the optical radiation over a known time period and frequency range to obtain the distance and velocity measurements.

BACKGROUND OF THE INVENTION

It is known that telemetry systems can comprise an apparatus that emits optical radiation pulses towards an object, and which measures the time that the optical radiation pulses take to reach the object and return to the apparatus. The pulse travel times can then be used to determine the distance of the object. Such devices are known to employ direct detection means to receive the reflected optical radiation.

Further, it is known to modulate the frequency of the emitted optical radiation signal so that optical heterodyne detection means can be employed. Optical heterodyne detection means allow detection at the quantum noise limit and, as a result, are significantly more sensitive than direct detection means. As such, the use of optical heterodyne detection means minimizes energy requirements while maximizing range, accuracy, and reliability characteristics. An additional advantage of employing optical heterodyne detection means, over direct detection means, is the ability to determine the radial velocity of an object by measuring the Doppler frequency shift.

When using optical heterodyne detection means, it is known to employ an optical system that directs the emitted optical radiation signal towards the object, and concentrates the reflected, or return, optical radiation signal for optimal heterodyne detection. The addition of optical polarizing means to such an optical system allows for selective reception of the return optical radiation signal, thereby maximizing the reliability of the optical heterodyne detection means.

DISCLOSURE OF THE INVENTION

The present invention is directed to an improved distance and velocity measuring apparatus which operates at a low energy input and power output level, and offers optimal range, accuracy and reliability capabilities. The apparatus includes an optical radiation source which emits a low power optical radiation signal that is easily and precisely amplitude modulated across a high frequency range. The frequency of amplitude modulation increases and decreases according to a linear, up-and-down ramp, as it is swept across a predetermined time period. The amplitude modulation is achieved by merely varying the magnitude of a small electrical input supplied to the optical radiation source. This eliminates the necessity of a crystal or acousto-optic modulator to introduce the amplitude modulation. Those known modulating devices basically block a varying portion of a constant amplitude optical radiation signal emitted from an optical radiation source. Relative to such prior art devices, the aforementioned amplitude modulation technique used in the present invention requires a lower average input energy, and allows for precise frequency modulation of the emitted optical radiation signal across a wider range of frequencies. As a result, the present invention can achieve a higher degree of accuracy than many of the prior art telemetry systems.

Optical components are used to direct the emitted optical radiation signal towards the object whose distance and velocity are to be measured. The optical system includes optical polarizing means to realize the benefits mentioned previously herein. In addition, the optical polarizing means are incorporated into the optical system in a manner that allows the return optical radiation signal to be received through many of the same optical components as those used to direct the emitted optical radiation signal towards the object. The use of common optical components for both emission and reception of the optical radiation signal reduces the weight, volume and complexity of the overall apparatus. Additional optical components and a spatial filter are provided to concentrate and selectively receive the return optical radiation signal to maximize the reliability of the detection means included in the apparatus.

High sensitive reception of the return optical radiation signal is realized through the inclusion of optical heterodyne detection means. The optical system is arranged so that a small portion of the emitted optical radiation signal is internally reflected back through the optical components and spatial filter, and received by the optical heterodyne detection means to provide a local oscillator signal. This method of obtaining a local oscillator signal allows for optimal overlap of the return and local signals, thereby maximizing the reliability and accuracy of the optical heterodyne detection means. In addition, the use of common optical components for transmitting and receiving the emitted, return and local signals minimizes the likelihood of error that may arise when the optical components include aberations or other imperfections.

In addition to receiving the local and return optical radiation signals, the optical heterodyne detection meanas also mixes the two optical radiation signals to produce an electrical output signal. Use of the optical heterodyne means to both receive and mix the local and return signals allows for optical radiation detection at the quantum noise level. As such, the present invention has greater range, accuracy and reliability capabilities than many prior art telemetry systems that employ separate noise producing means for receiving and mixing optical radiation signals. The output signal from the optical heterodyne detection means operates at a frequency of $f+S$ or $f-S$. Representative frequency values for $f+S$ and $f-S$ are obtained by measurement, then employed to calculate values for $f$ and $S$ separately. The frequency value for $f$ is then used to calculate the distance of the object. In making the calculation, the known time period for sweeping the frequency of amplitude modulation of the emitted optical radiation signal is employed. This method of obtaining a distance measurement eliminates the need for complicated and burdensome signal timing electronics. The frequency value for $S$ is a measurement of the Doppler frequency shift, and is used in a known manner to calculate the velocity of the object.

DETAILED DESCRIPTION OF THE PREFERRED EMBODIMENT

Figure 1:
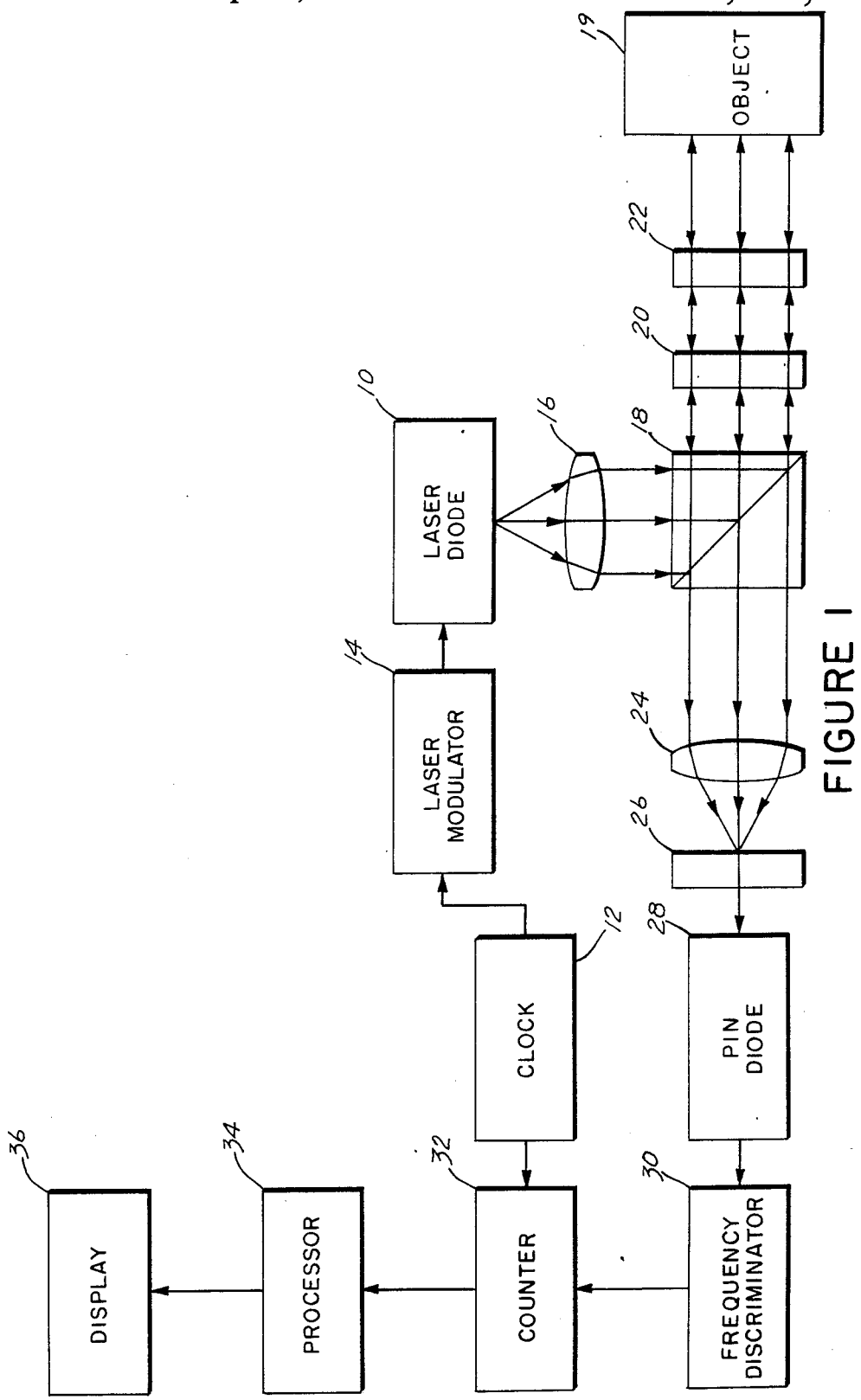
FIG. 1 is a block diagram showing the components of the present invention.

In accordance with the preferred embodiment of this invention, FIG. 1 shows a block diagram of the components of the apparatus. A single mode laser diode 10 emits a single burst of linearly polarized optical radiation that is amplitude modulated by varying an electrical input current to the diode 10. The burst will have, for example, a duration of about 20 milliseconds.

The emission of the optical radiation signal from the laser diode 10 is controlled by a clock 12 which simultaneously controls a laser modulator 14 that modules, or sweeps, the frequency of amplitude modulation of the emitted optical radiation signal across a predetermined frequency range $F_1$ over a known time period of $t'$. The frequency of amplitude modulation is centered about a predetermined frequency $F_2$ and increases and decreases across the frequency range $F_1$ according to a linear, up-and-down ramp. By way of example, the range of frequency modulation $F_1$ may be as large as one or two gigahertz. The frequency sweep time $t'$ is approximately 20 milliseconds, and roughly 20 frequency sweeps occur during said optical radiation burst.

The linearly polarized optical radiation signal from the frequency swept laser diode 10 is collimated by collimating optics 16 and then merged into an optical path through a polarization dependent beam splitter 18. The object whose distance and velocity are to be measured, lies somewhere within said optical path. A quarter wave retardation plate 20 converts the linearly polarized optical radiation signal to right hand circularly polarized optical radiation. Substantially all, (approximately 99%,) of the emitted optical radiation signal then passes through a local oscillator reflector plate 22 towards the object 19.

The emitted optical radiation signal reflects off of the object 19, and is thereby converted from right hand circularly polarized optical radiation to left hand circularly polarized optical radiation. A portion of the reflected, or return, optical radiation signal follows the aforementioned optical path and passes back through the local oscillator reflector plate 22. Upon passing through the quarter wave retardation plate 20, the return optical radiation signal is converted from left hand circularly polarized optical radiation to linearly polarized optical radiation that is orthogonal to the linear polarization of the signal initially emitted by the laser diode 10. As such, the return optical radiation signal passes through the polarization dependent beam splitter 18 undeflected, and is then concentrated by collecting optics 24. A spatial filter 26 allows only a portion of the concentrated return signal to pass through and be received by a PIN diode optical heterodyne detector 28. Conversion of the polarization of the transmitted optical radiation signal in the aforesaid manner allows for the use of common optical components to both send and receive the optical radiation, thereby minimizing the weight, size and complexity of the apparatus.

A very small portion of the optical radiation signal initially emitted from the laser diode 10 never leaves the apparatus as it is reflected off of the local oscillator reflector plate 22. Upon reflection, this local oscillator signal follows the same path to the PIN diode optical heterodyne detector 28 as described above with regard to the return signal. The return signal and local oscillator signal are photo-mixed in the PIN diode optical heterodyne detector 28 to produce an electrical output signal. The method described herein for obtaining a local oscillator signal guarantees proper overlap of the local oscillator signal and return signal for heterodyning, thereby optimizing the accuracy and reliability of the apparatus. In addition, use of the optical heterodyne detector 28 to both receive and mix the return and local oscillator signals allows for detection of the signals at the quantum noise limit.

A narrow-banded frequency discriminator 30 locks onto the electrical outut signal of the PIN diode optical heterodyne detector 28. By way of example, the frequency discriminator may be a phase lock loop comprised of a phase comparator, integrator and voltage controlled oscillator. When locked, the frequency discriminator 30 will be running at a frequency of approximately $f+S$ or $f-S$. The frequency $f$ represents a frequency difference between the return optical radiation signal and the local oscillator signal, while the frequency $S$ represents the Doppler frequency shift which occurs when the object 19 is moving.

Figure 2:
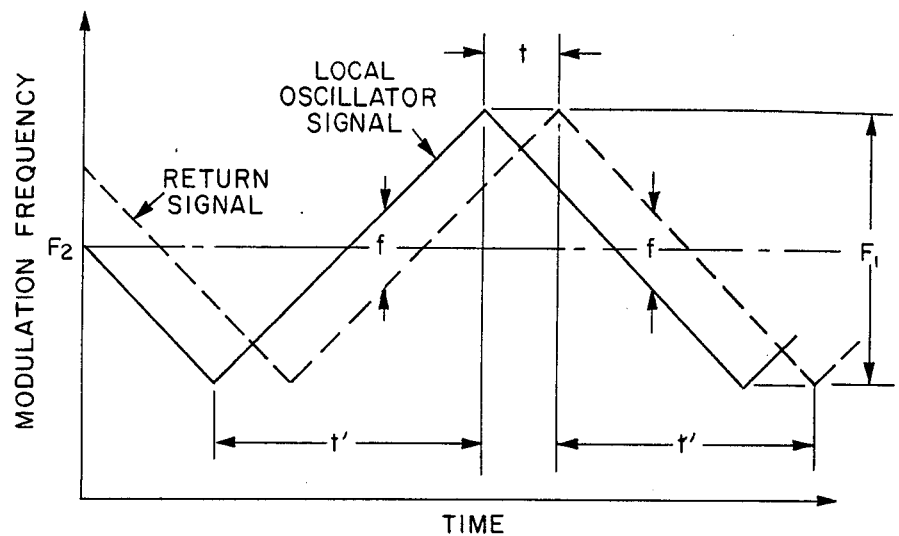
FIG. 2 is a graph showing the relationship between signal frequency and time for a return optical radiation signal and the corresponding local oscillator signal that are received when the object is not moving.

FIG. 2 is a graph representing the relationship between signal frequency and time for a return optical radiation signal and the corresponding local oscillator signal which are received by the PIN diode vertical heterodyne detector 28 when the object 19, whose distance and velocity are to be measured, is not moving. As shown, the two signals are both centered about a central frequency $F_2$, and sweep in a time $t'$ the frequency range of $F_1$. The offset in time between the signals, $t$, represents the total time required for the corresponding emitted optical radiation signal to reach the object 19 and return to the PIN diode optical heterodyne detector 28. The frequency $f$, as noted above, represents the frequency difference between the return optical radiation signal and the local oscillator signal. Since the object 19 is not moving, the Doppler frequency shift $S$ is zero, and is therefore not shown on the graph.

Figure 3:
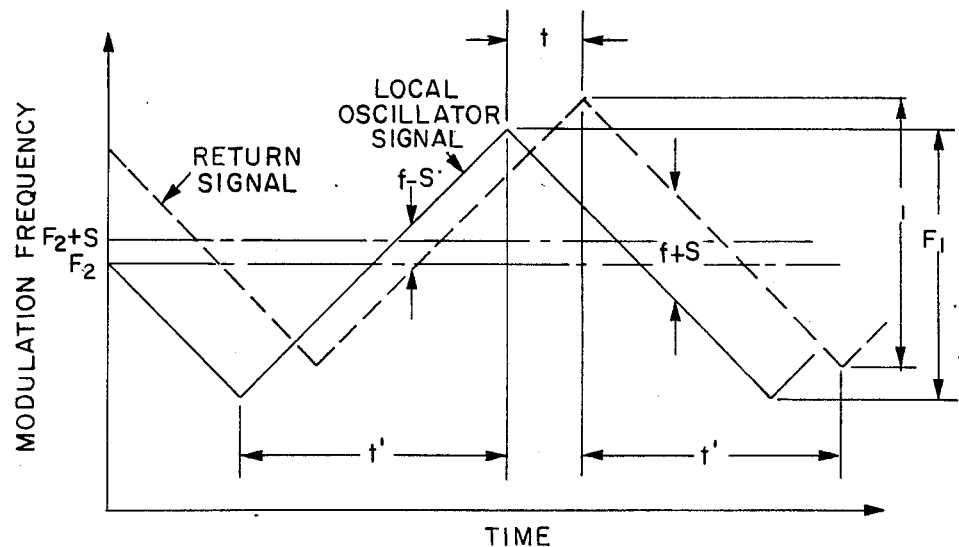
FIG. 3 is a graph showing the relationship between signal frequency and time for a return optical radiation signal and the corresponding local oscillator signal that are received when the object is moving towards the apparatus of the present invention.

FIG. 3 is a graph representing the relationship between signal frequency and time for a return optical radiation signal and the corresponding local oscillator signal which are received by the PIN diode optical heterodyne detector 28 when the object 19 is moving towards the apparatus. The graph is quite similar to the graph shown in FIG. 2 with the exception that the central frequency for the local oscillator signal is $F_2$, while the central frequency for the return signal is $F_2+S$. As noted above, the incremental frequency $S$ represents the Doppler frequency shift which results due to the movement of the object 19. If the object 19 were moving away from the apparatus the central frequency for the return signal would be $F_2-S$.

A counter 32, in electrical connection with the clock 12 and the frequency discriminators 30, measures the frequency of the optical heterodyne detector 28 output signal that is locked onto by the frequency discriminator 30. Such a frequency measurement is made for each up and down frequency modulation sweep of the output signal that occurs as a result of the aforementioned optical radiation burst. The frequency measurements for the up and down sweeps will be f+S or f−S. Each frequency measurement is outputted by the counter 32 to a processor 34. After all of the frequency measurements for a single optical radiation burst are received by the processor 34, the processor 34 determines a single representative value for both f+S and f−S. By adding such values for f+S and f−S, then dividing by two, the processor 34 finds a value for f. Similarly, by differencing the values for f+S and f−S, then dividing by two, the processor 34 determines ±S. Upon determining the frequency difference f and Doppler frequency shift ±S respectively, the processor 34 calculates the distance d and velocity v of the object 19.

The distance d is calculated by the processor 34 according to the formula set forth below:

$$d = \frac{ft'c}{2F_1}$$

In this formula, t' is the predetermined time period for sweeping the frequency of amplitude modulation of the emitted, return and local oscillator optical radiation signals; c is the speed of light and is therefore equal to the speed at which the emitted optical radiation signal travels to and from the object 19; and $F_1$ is the range of the frequency sweep of the amplitude modulation of the emitted, return and local oscillator optical radiation signals. Values for t', c and $F_1$ are known and engineered into the apparatus so that once the counter has determined the frequency difference f, the distance of the object 19 can be calculated by the processor 34 and displayed on a display 36.

The velocity v of the object 19 is calculated by the processor 34 according to the formula set forth below:

$$v = \frac{Sc}{F_2}$$

In this formula, c is the speed of light and is therefore equal to the speed at which the emitted optical radiation signal travels to and from the object 19, and $F_2$ is the central frequency of the frequency sweep of the amplitude modulation of the emitted and local oscillator optical radiation signals. Values for c and $F_2$ are known and engineered into the apparatus so that once the counter has determined the Doppler frequency shift ±S, the velocity v of the object 19 can be calculated by the processor 34 and displayed on the display 36. In addition, since the sign of S is also determined by the processor 34, the display 36 can indicate whether the object 19 is moving towards or away from the apparatus.

Based on the above detailed description, salient features of the present invention can be easily recognized. The disclosed apparatus employs a low energy optical radiation source that emits an optical radiation signal that is easily and precisely amplitude modulated across a high frequency range. The apparatus further comprises optical components that are used to both send and receive the optical radiation signal. The use of common optical components is made possible by the inclusion of optical polarizing means. The optical polarizing means also ensures optimal mixing of the local oscillator optical radiation signal and return optical radiation signal, thereby maximizing the accuracy, range and reliability of the apparatus. Since the apparatus uses optical heterodyne detection means, the power requirements are minimized while the range capabilities are maximized. By way of example, the range of the present invention is approximately 10 km, with an accuracy of ±0.5 m and an output power of about 20 milliwatts, when the object is a diffuse reflector having a reflectivity index of about 0.1. Finally, by measuring the frequency difference and Doppler frequency shift between a local oscillator optical radiation signal and the corresponding return optical radiation signal, the apparatus can determine the distance and velocity of the object without complex timing electronics.

What is claimed is:

1. In an apparatus for optically making measurements relating to an object, an assembly comprising:
   an optical radiation source that emits a first modulated optical radiation signal;
   first means for sweeping the frequency of modulation of said first optical radiation signal across a predetermined frequency range over a predetermined time period;
   optical directing means for directing a portion of said first optical radiation signal towards the object;
   second means for employing a portion of said first optical radiation signal to obtain a second optical radiation signal;
   optical receiving means for receiving at least a portion of said second optical radiation signal and a portion of said first optical radiation signal that reflects off of the object;
   optical mixing means responsive to said optical receiving means for mixing said received portions of said first and second optical radiation signals to produce an electrical output signal; and
   third means that employs said electrical output signal to determine a frequency difference that arises when said received portion of said first optical radiation signal travels to and from said object, and that employs said frequency difference, said predetermined frequency range and said predetermined time period to calculate the distance of the object relative to the apparatus.

2. An assembly, as recited in claim 1, wherein said optical directing and optical receiving means comprise optical radiation polarizing means.

3. An assembly, as set forth in claim 2, wherein said optical directing and optical receiving means comprise common optical components and common optical radiation polarizing means.

4. A method for use in optically making measurements relating to an object comprising the steps of:
   modulating a first optical radiation signal emitted by an optical radiation source;
   sweeping the frequency of modulation of said first optical radiation signal across a predetermined frequency range over a predetermined time period;
   optically directing a portion of said first optical radiation signal towards said object;
   employing a portion of said first optical radiation signal to obtain a second optical radiation signal;
   optically receiving at least a portion of said second optical radiation signal and a portion of said first optical radiation signal that reflects off of said object;
   optically mixing said received portions of said first and second optical radiation signals to produce an electrical output signal;

employing said electrical output signal to determine a frequency difference that arises when said received portion of said first optical radiation signal travels to and from said object; and utilizing said frequency difference, said predetermined frequency range and said predetermined time period to calculate the distance of said object.

5. A method, as set forth in claim 4, wherein the step of optically directing said first optical radiation signal towards said object, and the step of optically receiving said first and second optical radiation signals, include optically converting the polarization of the respective optical radiation signals.

6. An assembly, as recited in claim 1, wherein said optical radiation source is a single mode laser diode, and wherein said first modulated optical radiation signal emitted by said laser diode is modulated in amplitude in direct response to an electric current of varying magnitude that is supplied directly to said laser diode.

7. An assembly, as recited in claim 1, wherein said third means employs said electrical output signal to determine a frequency shift that arises when said received portion of said first optical radiation signal travels to and from said object, wherein the central frequency of said predetermined frequency range is known, and wherein said third means employs said frequency shift and said known central frequency to calculate the velocity of said object.

8. A method, as recited in claim 4, wherein said optical radiation source is a single mode laser diode, and wherein said modulating step comprises varying the magnitude of an electrical current supplied directly to said laser diode to modulate the amplitude of said first optical radiation signal.

9. A method, as recited in claim 4, wherein the central frequency of said predetermined frequency range is known, and further comprising the steps of:

employing said electrical output signal to determine a frequency shift that arises when said received portion of said first optical radiation signal travels to and from said object; and utilizing said frequency shift and said known central frequency to calculate the velocity of said object.

* * * * *